236-15 SR
1/6/87 OR 000,193

United States Statutory Invention Registration [19]

[11] Reg. Number: H193
[43] Published: Jan. 6, 1987

Bitner et al.

[54] ELECTRONIC TEMPERATURE EQUALIZER

[75] Inventors: Everett D. Bitner, Trivoli; Earl B. Lancaster, Peoria, both of Ill.

[73] Assignee: The United States of America as represented by the Secretary of Agriculture, Washington, D.C.

[21] Appl. No.: 873,299

[22] Filed: Jun. 9, 1986

Related U.S. Application Data

[63] Continuation of Ser. No. 696,274, Jan. 29, 1985, abandoned.

[51] Int. Cl.[4] ..... G05D 15/00
[52] U.S. Cl. ..... 236/15 BB; 236/78 R

[56] References Cited

U.S. PATENT DOCUMENTS

| | | | |
|---|---|---|---|
| 2,843,714 | 7/1958 | Stanton | 236/15 BF |
| 3,139,349 | 6/1964 | Swartz et al. | 236/15 BB |
| 3,534,809 | 10/1970 | Charitat, Jr. | 374/182 X |
| 3,563,460 | 2/1971 | Nine | 236/49 |
| 3,688,580 | 9/1972 | Jarzembski | 374/182 |
| 3,785,432 | 1/1974 | Kabat et al. | 236/78 D |
| 3,918,636 | 11/1975 | Dawson | 236/78 |

*Primary Examiner*—Deborah L. Kyle
*Assistant Examiner*—Michael J. Carone
*Attorney, Agent, or Firm*—M. Howard Silverstein; David G. McConnell; Curtis P. Ribando

[57] ABSTRACT

An electronic circuit has been devised for precisely controlling the temperature of one zone in response to a change in temperature in another zone. Two sensors, one in each zone, are wired in opposing polarity so as to emit a signal when a temperature imbalance occurs. The circuit is designed to actuate a temperature controller in response to the signal. One application for the device is the establishment of adiabatic conditions for a reaction by controlling the temperature of the zone surrounding the reaction vessel to coincide with that within the vessel.

6 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRONIC TEMPERATURE EQUALIZER

This application is a continuation of application Ser. No. 696,274, filed Jan. 29, 1985, now abandoned.

BACKGROUND OF THE INVENTION

1. Field of the Invention

It is sometimes desirable to control the temperature of a zone in response to a fluctuant temperature of another zone, so that a condition of thermal equilibrium continually exists between the two. The same may be true of liquid or solid bodies. The temperature of the "lead" zone or body, that is, the one which is independently variable, may fluctuate as the result of a biological or chemical process such as a fermentation or exothermic reaction. Alternatively, it may be influenced by some electrical or mechanical device.

This invention relates to an electronic temperature equalizer which is designed to very precisely achieve the type of interzonal control just described. One application of the equalizer is demonstrated in an adiabatic reactor, wherein the temperature of the zone surrounding the reaction vessel is continually adjusted to correspond to that within the vessel. We have found such a system to be useful in studying storage damage in grain, whereby a laboratory model can be constructed for duplicating the conditions in the center of a bin. Among other things, it could also he utilized to minimize temperature gradients throughout a reaction or crystallization product.

2 Description of the Prior Art

Most prior art temperature controllers are designed to establish and maintain a predetermined temperature value and to thereafter hold it at that value within a prescribed tolerance. For example, in Dawson, U.S. Pat. No. 3,918,636, the objective is to maintain one or more bodies of water at a constant temperature as required for laboratory experimentation. The temperature is preset by means of a variable resistor in one arm of a Wheatstone bridge having a thermistor used as a sensor in another arm. In U.S. Pat. No. 3,563,460. Nine shows a system for maintaining stored grain at a predetermined temperature by activating a fan in response to heat generated by the grain. The control device employs the same Wheatstone bridge arrangement employed by Dawson.

It becomes eminently apparent from a review of the prior art that to devise a means for following a target temperature which is independently variable would require a basic departure from the conventional concepts heretofore known.

SUMMARY OF THE INVENTION

We have now developed a control device which will maintain the temperature of a controlled zone the same as that of a lead zone which is subject to thermal change. The device utilizes two sensors wired in opposing polarity so as to emit an input signal when a temperature imbalance occurs between the zones. After amplification, the signal is enhanced in a signal processor and evolves as an output pulse. The pulse triggers a heater or cooler for adjusting the temperature of the controlled zone to coincide with that of the lead zone.

It is an objective of the invention to provide a temperature equalizer which is precise, reliable, inexpensive, and adaptable to a plurality of applications.

A more particular object of the invention is to illustrate the operability of the equalizer in combination with an adiabatic reactor Other objects and advantages of the invention will become readily apparent, from the ensuing description.

BRIEF DESCRIPTION OF THE DRAWINGS

FIG. 2 is a detailed schematic diagram depicting a specific embodiment of the invention.

DETAILED DESCRIPTION OF THE INVENTION

The term "zone" will be used herein to relate to any defined space or body which lends itself to the monitoring and/or control of its thermal state. The "lead" zone is that in which the temperature is independently variable and the "controlled" zone is that in which the temperature is adjusted. It is contemplated that there can be more than one controlled zone, and that the lead zone and controlled zones may or may not be in heat exchange relationship with one another. For purposes of illustration, however, the invention will be described in the context of an adiabatic reactor in which the thermal integrity of the reaction vessel is maintained by totally encompassing it within the controlled temperature chamber. Inasmuch as the net temperature differential between the vessel and the chamber will always approximate zero, the observed temperature changes within the vessel will be a true representation of the thermal profile of the reaction.

Figure 1:
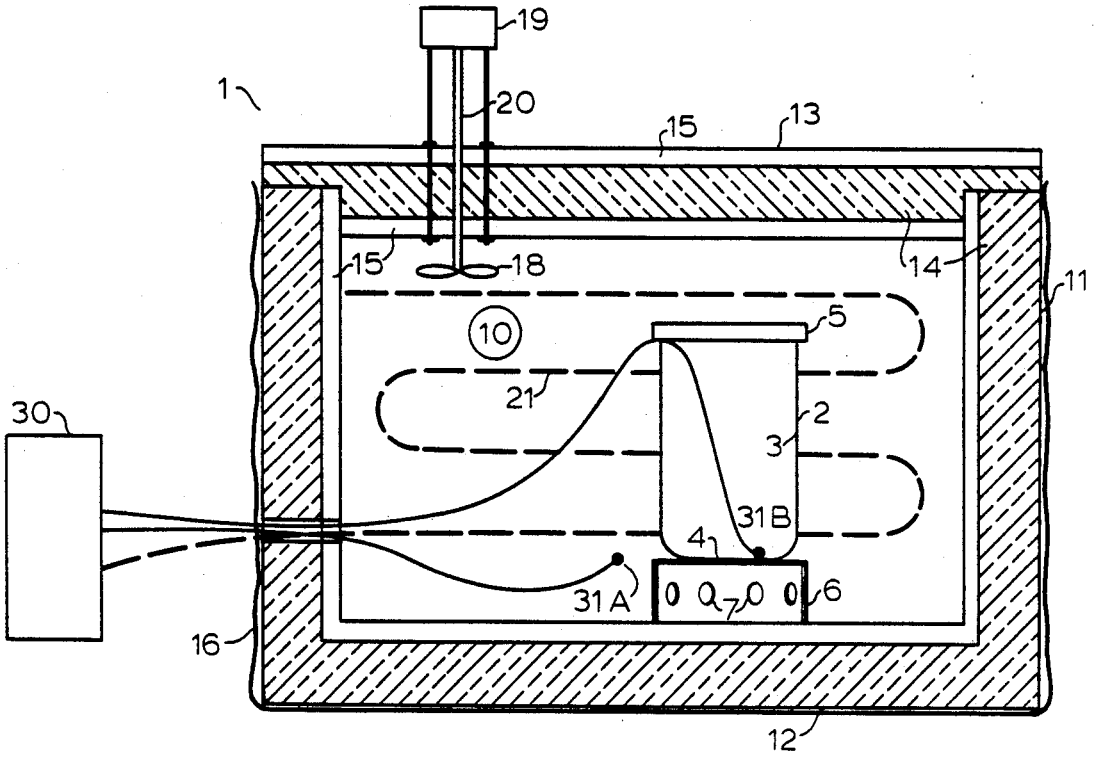
FIG. 1 is a cross-sectional view of an adiabatic reactor embodying the instant invention.
Figure 7:
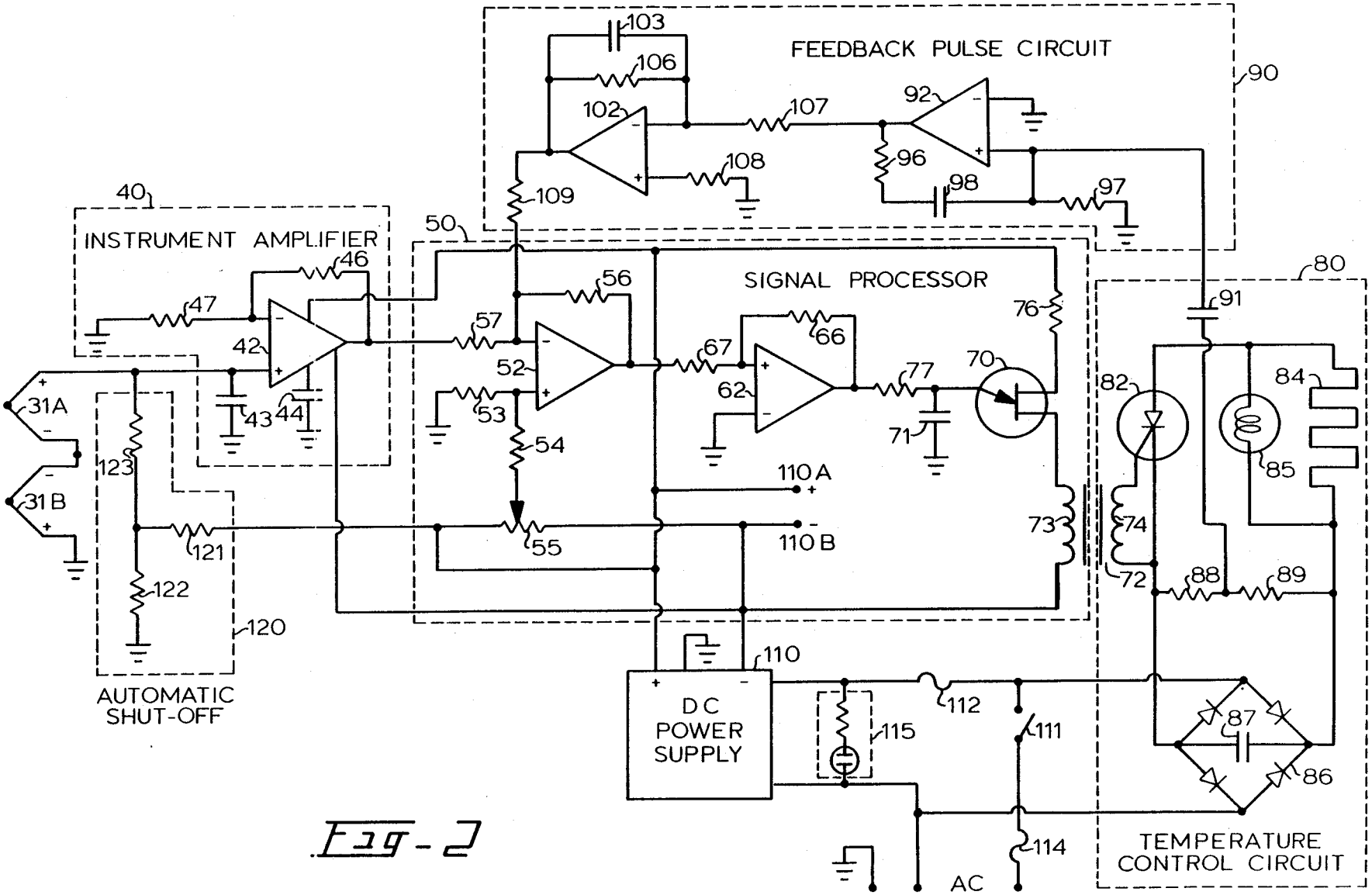

Referring to FIG. 1, the adiabatic reactor 1 comprises reaction vessel 2 as the lead zone and chamber 10 as the controlled zone. The vessel is composed of side wall 11, bottom wall 4, and sealable lid 5. Conventional uninsulated laboratory equipment will serve the purpose insofar as it is the function of the inventive device in combination with chamber 10 to prevent any heat exchange with the ambient. However, for applications in which heat exchange control or moisture containment is extremely critical, an insulative vessel such as a Dewer flask may be used.

Chamber 10 comprises side walls 11, bottom wall 12, and sealable top 13, all constructed of a thermal insulating material 14 and a rigid material 15 for support. The chamber may also be surrounded by an optional vapor barrier 16 as known in the art. A fan 18 driven by motor 19 via shaft 20 circulates the air throughout the interior of chamber 10 in order to insure a uniform temperature. By mounting the motor on the exterior of the chamber, the system is substantially isolated from the effects of motor heat.

In FIG. 1, the means for effecting temperature adjustment within chamber 10 is illustrated by a resistance-type heating element 21. Of course, other devices for heating or cooling the chamber could be used. Situated within vessel 2 and chamber 10 are identical sensors 31A and 31B, respectively, extending from the temperature equalizer 30.

In the embodiment of the equalizer illustrated in the schematic of FIG. 2, the sensors are two type J thermocouples wired on series in opposing polarity. Of course, with appropriate adjustments to the instrument amplifier described hereafter, other types of sensors such as thermistors or temperature-sensitive diodes could be substituted for the thermocouples. With the arrangement of sensors 31A and 31B as shown in the figure, any time the temperature in the vessel exceeds that in the chamber, a signal is generated and applied to the noninverting input of amplifier 42 in instrument amplifier 40. Capacitor 43 filters out input noise and transient pulses from the sensors, and capacitor 44 is a filter for the amplifier 42. The amplifier gain is set by resistors 46 and 47.

The output signal from instrument amplifier 40 is transmitted to signal processor 50 as input to the inverting side of amplifier 52. Resistors 53 and 54 constitute a voltage divider which acts in conjunction with variable resistor 55 for nulling amplifier 52. The gain is set by resistors 56 and 57, the latter of which additionally forms a direct coupling for the output signal from instrument amplifier 40. Amplifier 52 is direct coupled to the noninverting input of amplifier 62 by means of resistor 67. Resistors 66 and 67 set the gain of amplifier 62 which is direct coupled to unijunction transistor 70 by means of resistor 77. The charge and discharge cycle of capacitor 71 triggers the unijunction transistor 70 which in turn permits pulse waveforms to pass in the primary coil 73 of pulse transformer 72. A voltage dropping resistor 76 is provided in line with unijunction transistor 70.

In temperature control circuit 80, current from AC power supply is rectified by bridge circuit 86 to pulsating DC and noise is filtered from the bridge circuit by capacitor 87. Secondary coil 74 of transformer 72 triggers current flow in silicon-controlled rectifier (SCR) 82 for controlling heating element 84 and null indicator 85. A voltage divider composed of resistors 88 and 89 establishes a feedback voltage which is coupled by capacitor 91 from circuit 80 to the noninverting input of amplifier 92 in feedback pulse circuit 90.

In conjunction with resistors g6 and g7 and capacitor 98 which function together as wave-shaping components, amplifier 92 generates a square wave each time it receives a feedback pulse. Amplifier 92 is direct coupled to the inverting input of amplifier 102 by means of voltage reducing resistor 107. Resistors 106 and 108 and capacitor 103 further reshape the feedback pulse prior to it being applied to the inverting input of amplifier 52 through direct coupling resistor 109.

The circuitry comprising the instrument amplifier 40, the signal processor 60, and the feedback pulse circuit 90 is powered by DC power supply 110. Amplifiers 52, 62, 92, and 102, either individually or as an integrated quad op-amp are connected to the DC power at 110A and 110B. Power supply 110 and temperature control circuit 80 are in turn powered from an AC power source controlled by manually operated switch 111 and are protected by fuses 112 and 114, respectively. Pilot light 115 indicates the ON/OFF condition of the AC power source. The device is further provided with an automatic shutoff 120 composed of resistors 121 and 122 functioning as a voltage divider in combination with high impedance resistor 123.

OPERATION OF THE INVENTION

For purposes of illustration, the invention will now be described in terms of heating chamber 10 in response to an exothermic reaction in vessel 2. At the start of the reaction, vessel 2 and chamber 10 will most likely be in equilibrium with one another. Thus, when switch 111 is closed and variable resistor 55 is properly nulled, sensors 31A and 31B will be in balance, resulting in nil output to instrument amplifier 40. Likewise, any time in which the temperature in chamber 10 exceeds that in the vessel, the signal to amplifier 40 would be nil. On the other hand, when the temperature in the vessel exceeds that in the chamber, then the voltage across thermocouple 31B surpasses that across thermocouple 31A, and a signal is applied to instrument amplifier 40. The amplified signal is mixed with the feedback pulse from the feedback pulse circuit 90, thereby insuring a proportional control and a positive trigger for the unijunction transistor 70 after further amplification in signal processor 50. The pulse generated in transformer 72 by the unijunction transistor in turn triggers the temperature control circuit 80 to turn on heater 84. The heater will remain ON as long as the voltage differential exists between sensors 31A and 31B. The sensitivity of the system in regard to responding to temperature differences between the respective zones is of course a characteristic of the particular sensors and components selected for the circuitry. In the event that one of the sensors burns out, automatic shutoff 120 will apply a positive voltage to amplifier 42, producing zero output and shutting off the heater.

For purposes of cooling chamber 10 in response to an endothermic reaction in vessel 2, sensors 31A and 31B can be interchanged, and a cooler substituted for the heater previously described. When the balance between the temperatures of vessel 2 and chamber 10 is upset by a lowering of temperature in the vessel, the system will be activated to turn on the cooler in chamber 10 until equilibrium is restored.

In either of the heating or cooling modes, the equalizer is functional only when the temperature imbalance across the sensors is in the direction which lends itself to adjustment by the particular device installed in the temperature control circuit. It is envisioned, however, that the system could be modified so that the chamber temperature would follow a bidirectionally fluctuating vessel temperature. One functional arrangement would utilize a combination of two of the equilibrating devices: one for controlling a heater, and one for a cooler, each arranged as previously described. Alternatively, the temperature control circuit 80 could be designed to alternately switch from heating to cooling depending on the presence or absence of a pulse to SCR 82.

It is understood that the foregoing detailed description is given merely by way of illustration and that modification and variations may be made therein without departing from the spirit and scope of the invention.

We claim:

1. An apparatus for controlling the temperature within a first zone so as to coincide with the temperature within a second zone comprising:

(a) a first temperature sensor within said first zone and a second temperature sensor within said second zone, wherein said sensors are interconnected so as to generate an input signal when an imbalance in temperature occurs between said zones;

(b) a signal conditioner for enhancing said input signal and for generating an output signal;

(c) temperature control means responsive to said output signal for adjusting the temperature of said first zone to correspond to the temperature of said second zone.

2. The apparatus as described in claim 1 wherein said temperature control means is a heater.

3. The apparatus as described in claim 1 and further comprising a feedback circuit from said temperature control means to said signal conditioner for further enhancing said input signal.

4. The apparatus as described in claim 1 wherein said first and second temperature sensors are identical thermocouples.

5. The apparatus as described in claim 1 wherein said first and second zones are in heat exchange relationship to one another.

6. The apparatus as described in claim 5 wherein said first zone totally encompasses said second zone.

* * * * *